United States Patent
Liu

(10) Patent No.: US 8,122,648 B1
(45) Date of Patent: Feb. 28, 2012

(54) ROOF MOUNTING SYSTEM

(76) Inventor: Jun Liu, Camas, WA (US)

( * ) Notice: Subject to any disclaimer, the term of this patent is extended or adjusted under 35 U.S.C. 154(b) by 44 days.

(21) Appl. No.: 12/767,726

(22) Filed: Apr. 26, 2010

Related U.S. Application Data

(63) Continuation-in-part of application No. 12/698,634, filed on Feb. 2, 2010.

(51) Int. Cl.
*E04D 13/18* (2006.01)

(52) U.S. Cl. ......... 52/58; 126/623; 136/244; 248/205.1; 248/237; 52/173.3

(58) Field of Classification Search ............... 52/27, 58, 52/60, 62, 173.3, 698; 248/205.1, 237; 126/623; 136/244
See application file for complete search history.

(56) References Cited

U.S. PATENT DOCUMENTS

| | | | |
|---|---|---|---|
| 2,020,522 A | | 11/1935 | Seguin |
| 3,408,780 A | * | 11/1968 | Brister ............................. 52/58 |
| 4,043,239 A | | 8/1977 | DeFusco |
| 4,226,058 A | * | 10/1980 | Riley ............................... 52/27 |
| 4,321,745 A | * | 3/1982 | Ford ........................... 29/525.04 |
| 5,603,187 A | * | 2/1997 | Merrin et al. ...................... 52/58 |
| 5,609,326 A | * | 3/1997 | Stearns et al. ............... 256/12.5 |
| 6,360,491 B1 | | 3/2002 | Ullman |
| 6,526,701 B2 | | 3/2003 | Stearns et al. |
| 6,758,625 B1 | | 7/2004 | Lawrence |
| 7,762,027 B1 | * | 7/2010 | Wentworth et al. .......... 52/173.3 |
| 7,814,899 B1 | * | 10/2010 | Port ............................... 126/623 |
| 7,857,269 B2 | * | 12/2010 | Plaisted et al. ................ 248/237 |
| 7,895,808 B1 | * | 3/2011 | Wentworth et al. ............ 52/741.1 |
| 7,905,064 B1 | * | 3/2011 | Wentworth et al. .......... 52/173.3 |
| 7,921,607 B2 | * | 4/2011 | Thompson et al. ............... 52/60 |
| 2002/0046506 A1 | * | 4/2002 | Ullman .............................. 52/1 |
| 2002/0066235 A1 | * | 6/2002 | Stearns et al. ..................... 52/24 |
| 2003/0101662 A1 | * | 6/2003 | Ullman ............................ 52/27 |
| 2003/0177706 A1 | * | 9/2003 | Ullman .............................. 52/3 |
| 2006/0156648 A1 | * | 7/2006 | Thompson et al. .......... 52/173.3 |

(Continued)

FOREIGN PATENT DOCUMENTS

JP 57-47153 * 3/1982

OTHER PUBLICATIONS

Office Action mailed Oct. 12, 2011, in co-pending U.S. Appl. No. 13/078,528.

*Primary Examiner* — Robert Canfield
(74) *Attorney, Agent, or Firm* — Alan M. Flum; Stone Creek LLC

(57) ABSTRACT

A system is disclosed for mounting equipment, such as solar panels, to a roof that has shingles. A base plate has at least one mounting aperture therethrough for securing to the roof with a mechanical wood fastener, and at least one bracket projection in an upper surface thereof for securing with a mechanical machine fastener. A flashing plate has a base plate recess formed in a lower surface thereof for receiving the base plate therein. A mounting bracket has at least one aperture therein for receiving one of the bracket projections therethrough for securing the mounting bracket to the at least one bracket projection in the base plate, and through corresponding apertures in the flashing plate. The mounting bracket further includes an attachment aperture adapted to be fixed with the equipment. Additional advantages include using fewer parts by integrating above elements to reduce the costs and steps of installation.

8 Claims, 12 Drawing Sheets

U.S. PATENT DOCUMENTS

| | | | |
|---|---|---|---|
| 2006/0260670 A1* | 11/2006 | Terunuma et al. | 136/244 |
| 2008/0053008 A1* | 3/2008 | Ohkoshi et al. | 52/173.1 |
| 2008/0121273 A1* | 5/2008 | Plaisted et al. | 136/251 |
| 2009/0019796 A1* | 1/2009 | Liebendorfer | 52/173.3 |
| 2010/0088996 A1* | 4/2010 | Thompson et al. | 52/704 |
| 2010/0192505 A1* | 8/2010 | Schaefer et al. | 52/653.2 |
| 2010/0236155 A1* | 9/2010 | Lanza | 52/58 |
| 2010/0307074 A1* | 12/2010 | Stearns et al. | 52/173.1 |
| 2011/0120047 A1* | 5/2011 | Stearns et al. | 52/698 |
| 2011/0179727 A1* | 7/2011 | Liu | 52/173.3 |

* cited by examiner

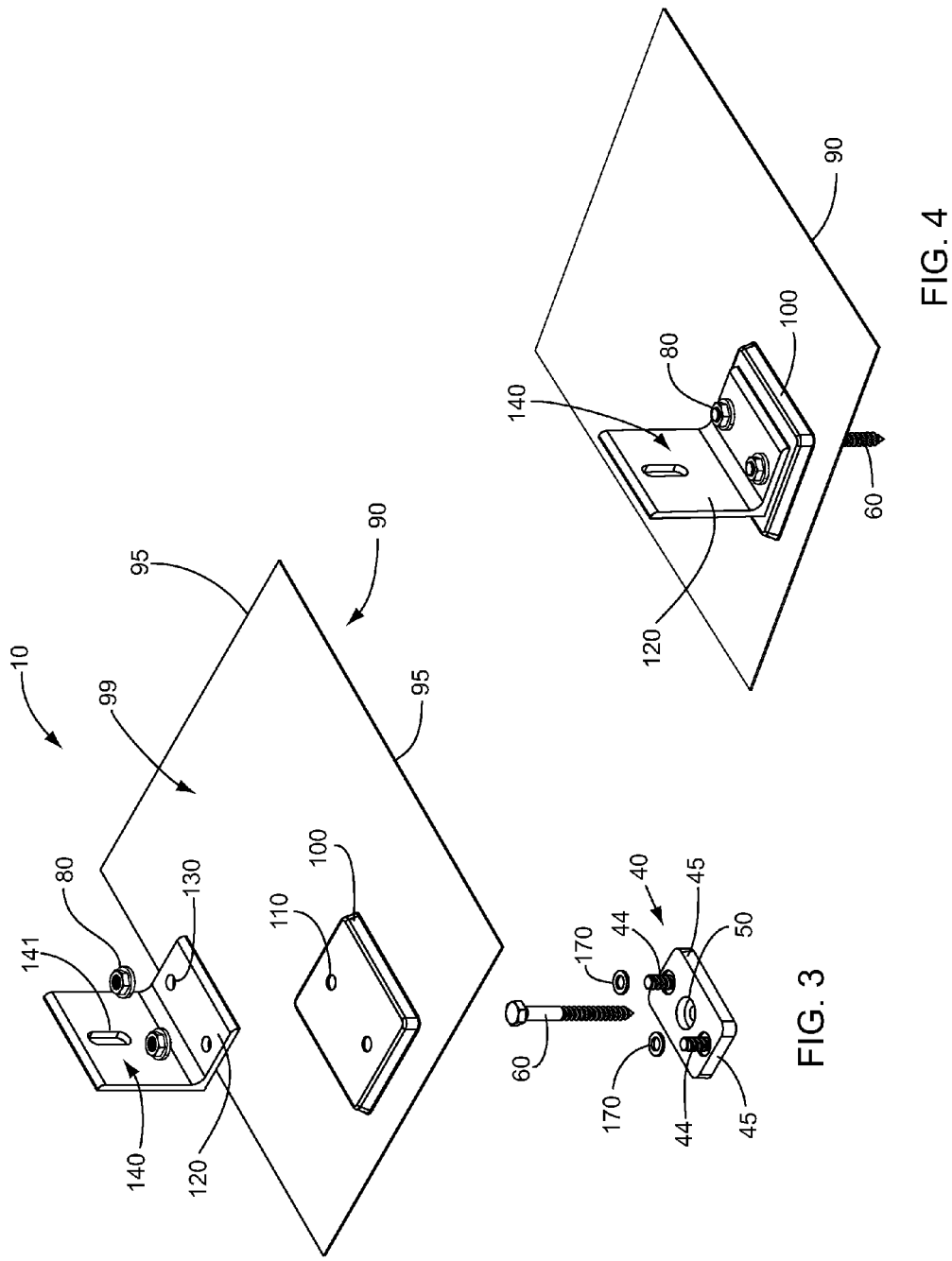

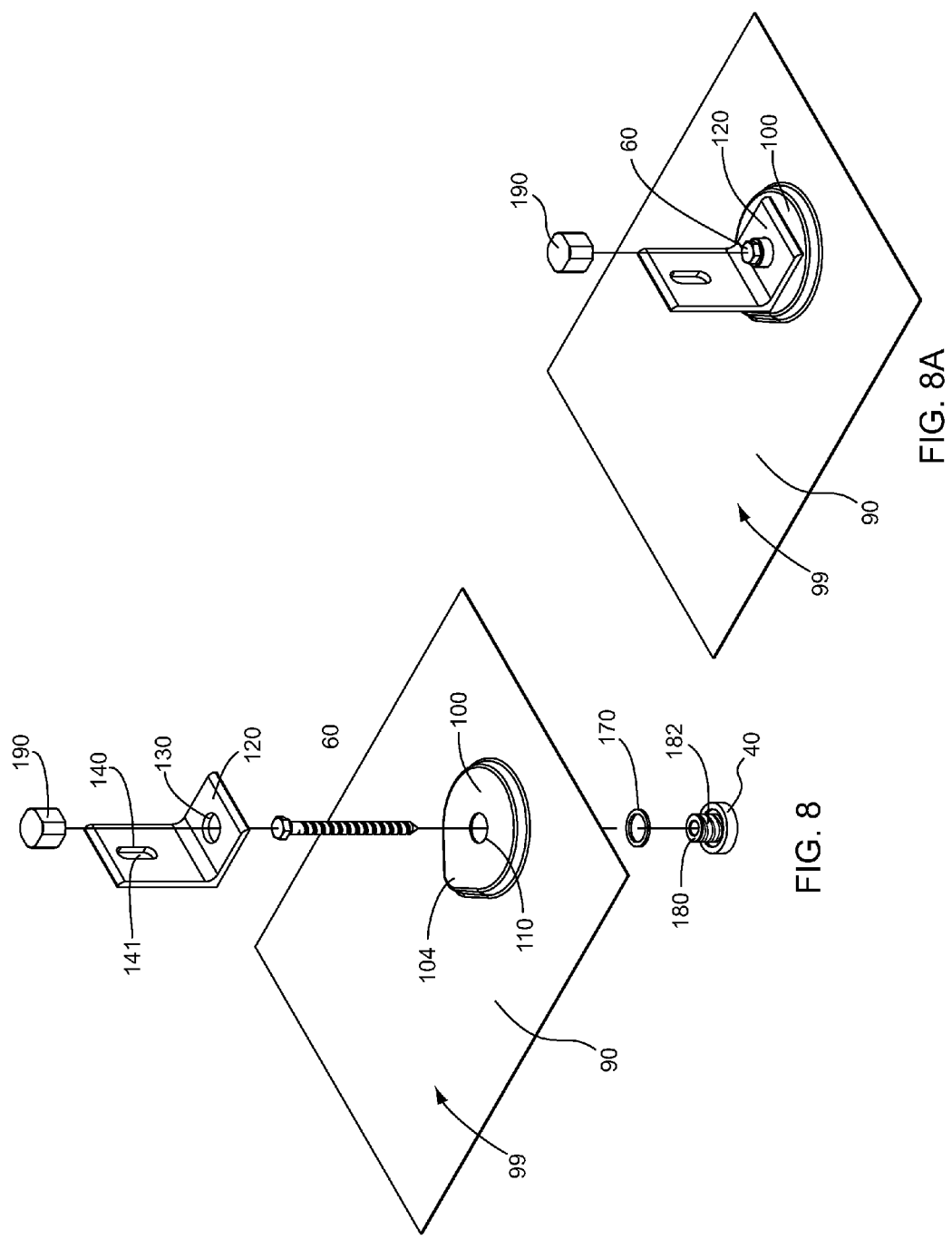

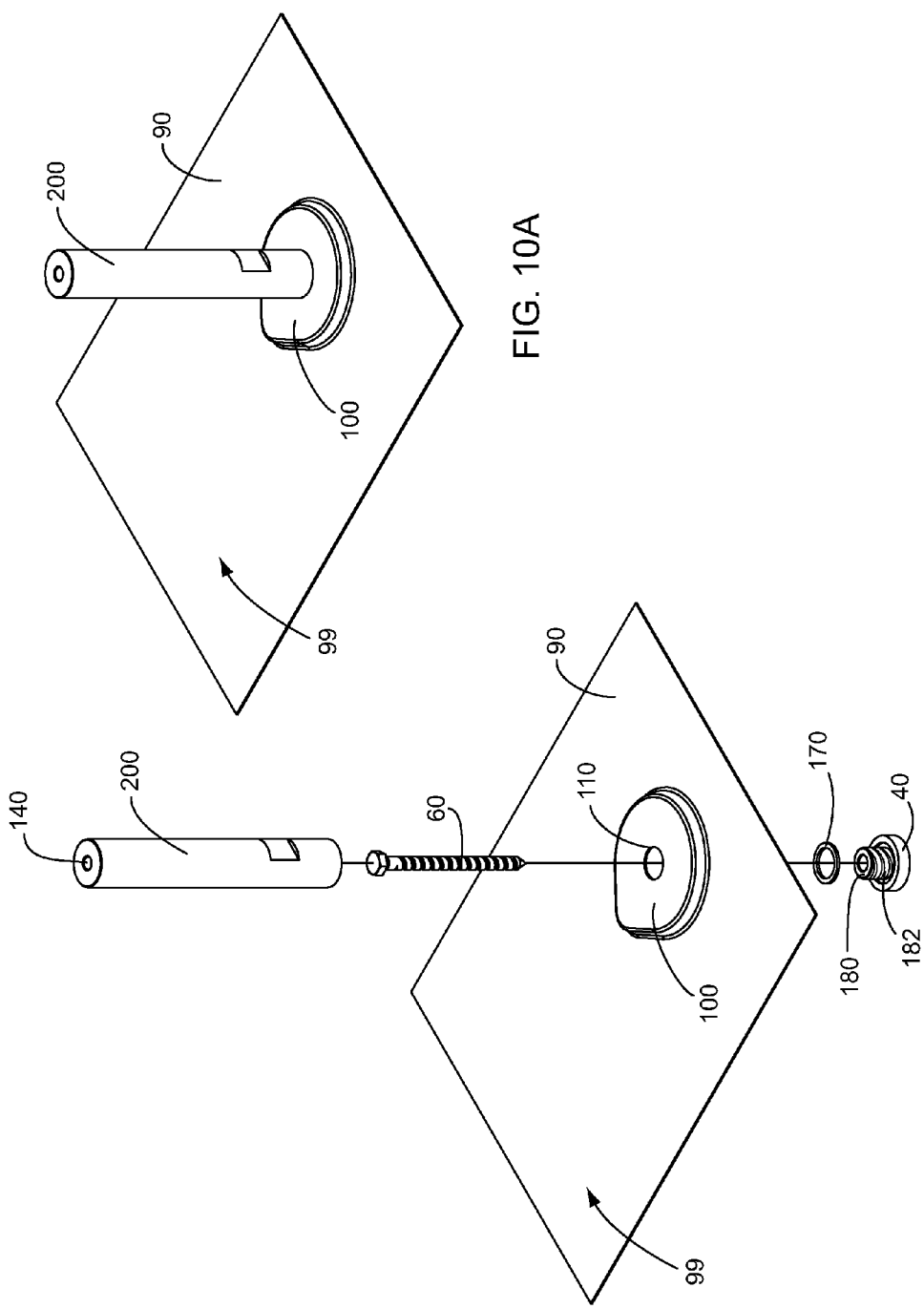

ROOF MOUNTING SYSTEM

CROSS-REFERENCE TO RELATED APPLICATIONS

This application is a Continuation-in-Part of U.S. patent application Ser. No. 12/698,634, filed on Feb. 2, 2010, incorporated herein by reference.

STATEMENT REGARDING FEDERALLY SPONSORED RESEARCH AND DEVELOPMENT

Not Applicable.

FIELD OF THE INVENTION

This invention relates to solar panel installation hardware, and more particularly to roof-based solar panel installation hardware.

DISCUSSION OF RELATED ART

Solar panel installations on residential and business rooftops are become more popular, and consequently there is a need for more effective methods for mounting such equipment to roofs while preventing water from leaking through the roof. Conventional mounting brackets allow such equipment to be mounted to a roof, but leave pathways for water to flow to the roof, resulting in an increased likelihood of roof leakage.

The device disclosed in U.S. Pat. No. 6,526,701 to Stearns et al. on Mar. 4, 2003, teaches a roof mounting bracket for securing a mounting bracket to a base plate that itself is mounted to the roof, a water impervious flashing plate being disposed between the mounting bracket and the base plate. However, such a device leaves a considerable gap between the flashing plate and the roof, due in part to the thickness of the base plate. In windy and rainy conditions, this provides a pathway for water to reach the base plate and the mounting apertures thereof, resulting in potential leaks. Further, such a device has a relatively large number of parts, depending on the type of installation and equipment to be mounted, resulting in increased cost.

Therefore, there is a need for a system that allows relatively easy and inexpensive mounting of different types of equipment to a roof. Such a needed system would provide for a water-impervious flashing plate that lies directly onto the roof shingles, providing substantially no opportunity for water to reach the apertures for mounting the system to the roof. Further, such a needed invention would provide for either quick mounting to the roof, roof joist, or both. Moreover, such a needed invention would allow for different types of mounting brackets to be used, based on the type of equipment to be installed, each with a common interface to the other parts of the system, thereby minimizing the number of components necessary for such a system. The present invention accomplishes these objectives.

SUMMARY OF THE INVENTION

The present device is a system for mounting equipment, such as a solar panel, to a roof having shingles. The system includes a base plate having a lower surface, an upper surface, a peripheral edge, and at least one mounting aperture therethrough for securing to the roof with a mechanical wood fastener and preferably secured to a joist supporting the roof. At least one bracket projection projects upwardly from the upper surface thereof and is adapted for securing with a mechanical machine fastener.

A flashing plate has a lower surface, an upper surface, and a peripheral edge. A base plate recess is formed in the lower surface thereof and adapted to receive the base plate therein such that the lower surface of the base plate may be substantially coplanar with the lower surface of the flashing plate. Preferably, a portion of the base plate recess is tapered at an upper edge thereof. The base plate recess includes one corresponding aperture therethrough for each bracket projection of the upper surface of the base plate. Preferably, the system includes an elastomeric ring placed on each bracket projection between each mechanical machine fastener and the base plate for inhibiting liquid from flowing through the mounting bracket.

A mounting bracket has at least one aperture therein and is adapted for receiving one of the bracket projections therethrough for securing the mounting bracket to the at least one bracket projection of the upper surface of the base plate, through the corresponding aperture in the flashing plate. The mounting bracket further includes attachment means to be fixed with the equipment.

The following embodiments provide additional advantages and benefits of using fewer parts by integrating structures thereby reducing the costs and steps of installation. In one embodiment, the at least one mounting aperture and the at least one bracket projection are combined into at least one hollow projection whereby the mechanical wood fastener passes through the at least one hollow projection. In another embodiment, the at least one hollow projection is threaded on an outside surface thereof and the mechanical machine fastener is a threaded cap. In another alternate embodiment, the threaded cap and the mounting bracket are combined into an integral mounting cap. In one more embodiment, the base plate and the mechanical wood fastener are combined into an integral base fastener.

The present invention is a system that allows relatively easy and inexpensive mounting of different types of equipment to a roof having shingles. The present invention provides for a water-impervious flashing plate that lies directly onto the roof shingles, providing substantially no gap through which water may reach the apertures for mounting the system to the roof. Further, the present system provides for either quick mounting to the roof, roof joist, or both. The present system also allows for different types of mounting brackets to be used, based on the type of equipment to be installed, each with a common interface to the other parts of the system, thereby minimizing the number of components necessary for such a system. Other features and advantages of the present invention will become apparent from the following more detailed description, taken in conjunction with the accompanying drawings, which illustrate, by way of example, the principles of the invention.

DESCRIPTION OF THE DRAWINGS

FIG. 3 is an exploded perspective view of a first embodiment of the invention, illustrating a bracket projection;

FIG. 4 is a perspective view of the first embodiment of the invention;

FIG. 8 is an exploded perspective view of a second embodiment of the invention;

FIG. 8A is a partially exploded perspective view of a second embodiment of the invention;

FIG. 10 is an exploded perspective view of a third embodiment of the invention;

FIG. 10A is a perspective view of the third embodiment of the invention;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
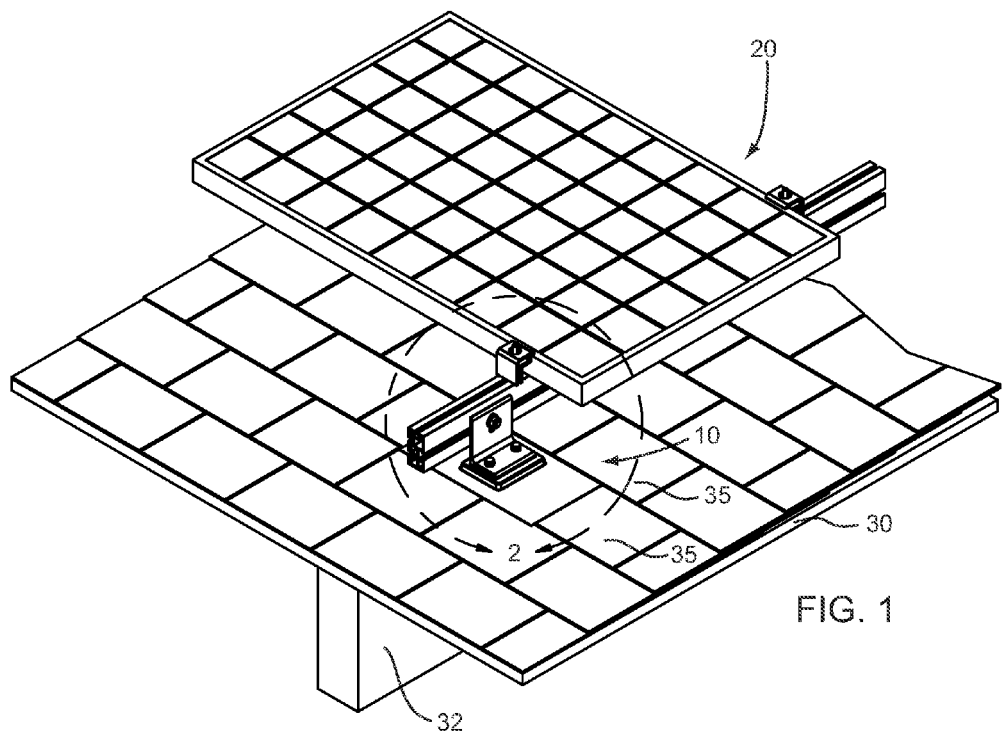
FIG. 1 is a perspective view of the invention, illustrated as installed on a roof.
Figure 2:
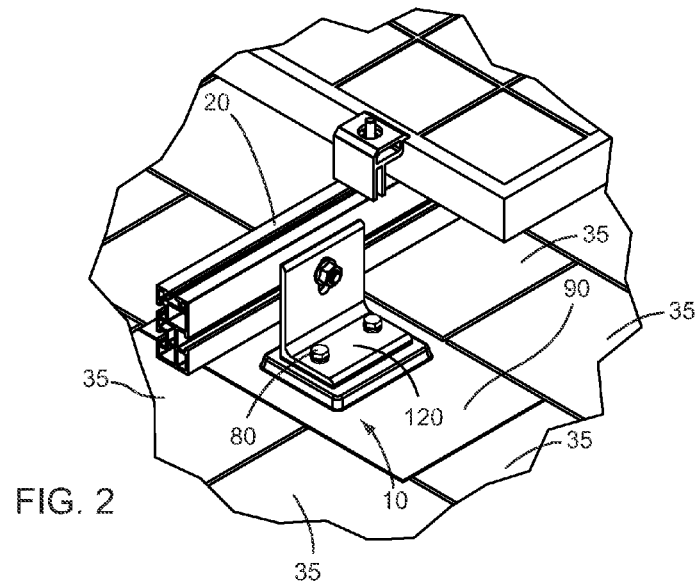
FIG. 2 is an enlarged perspective view of the invention, taken generally about line 2-2 of FIG. 1.

With respect to the drawings, FIG. 1 illustrates a system 10 for mounting equipment 20, such as a solar panel, to a roof 30 having shingles 35. Such shingles 35 overlap each other such that water running down and off of one shingle 35 drops onto another of the shingles 35 without reaching the roof 30. In FIGS. 3-6, the system 10 includes a base plate 40 having a lower surface 42, an upper surface 48, a peripheral edge 45, and at least one mounting aperture 50 therethrough for securing to the roof 30 with a mechanical wood fastener 60. In a preferred embodiment in FIG. 1, the system 10 is secured to a joist 32 supporting the roof 30. In FIG. 3, at least one bracket projection 44 projects upwardly from the upper surface 48 thereof and is adapted for securing with a mechanical machine fastener 80. In a preferred embodiment illustrated in FIG. 3, the base plate 40 has one mounting aperture 50 therethrough and two bracket projections 44. Preferably the base plate 40 is made from a rigid metal or plastic material.

Figure 5:
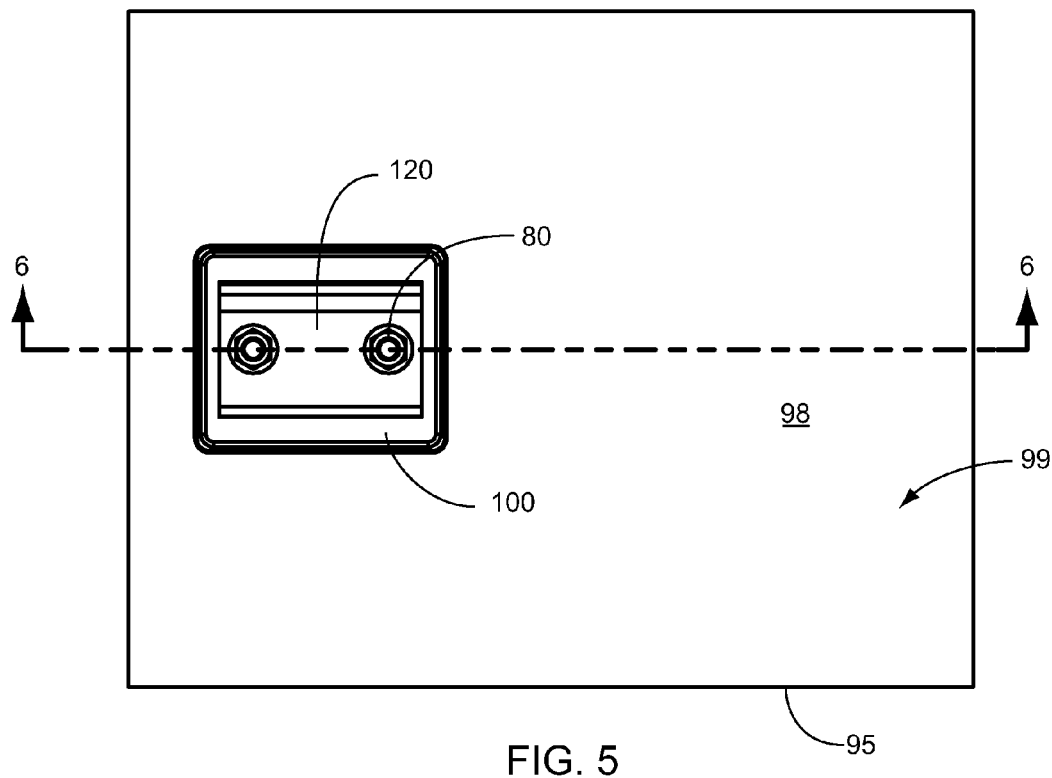
FIG. 5 is a top plan view of the first embodiment of the invention.
Figure 6:
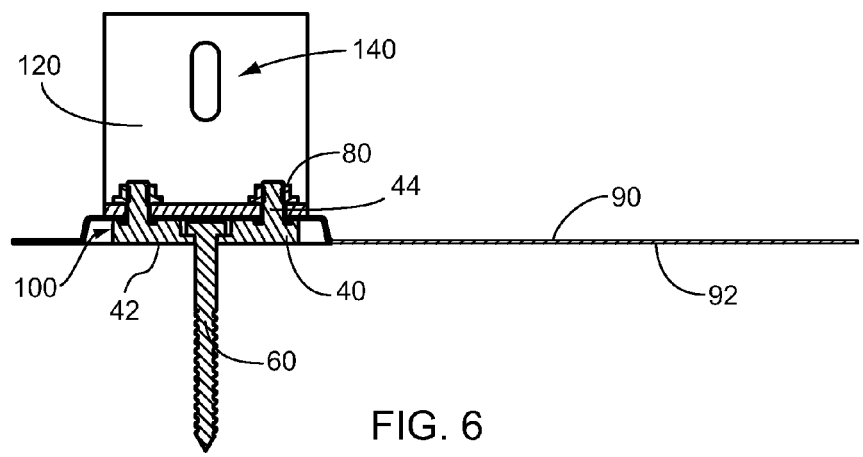
FIG. 6 is a cross-sectional view of the first embodiment of the invention, taken generally along lines 6-6 of FIG. 5.
Figure 7:
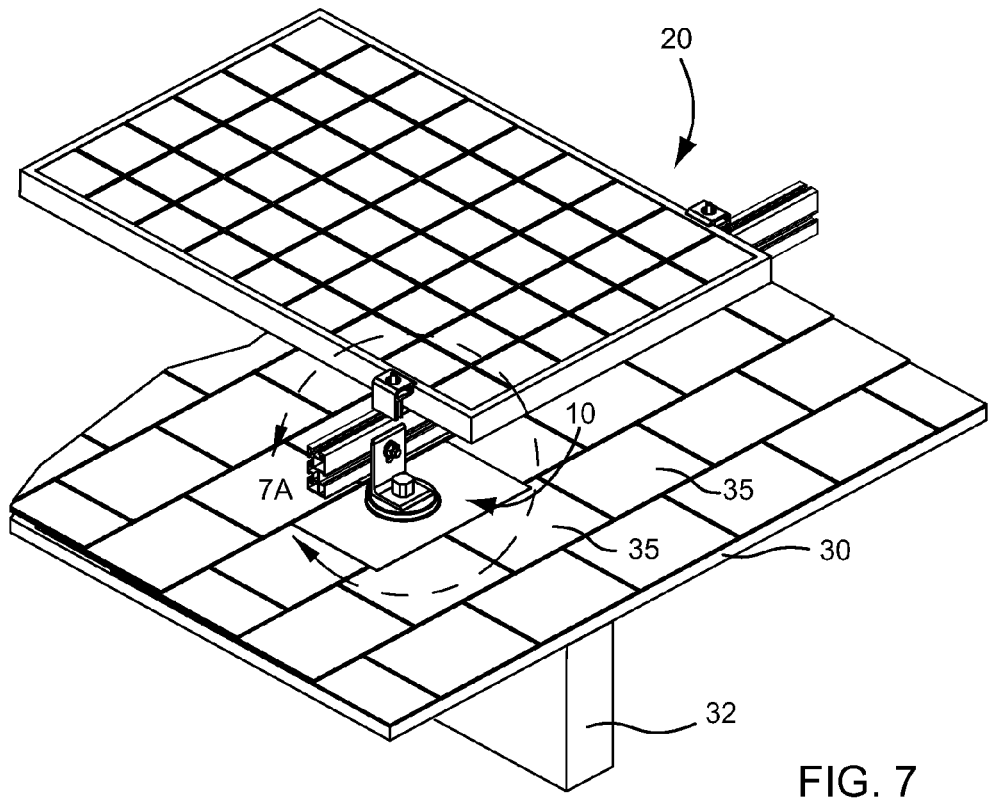
FIG. 7 is a perspective view of a second embodiment of the invention, illustrated as installed on a roof.
Figure 7A:
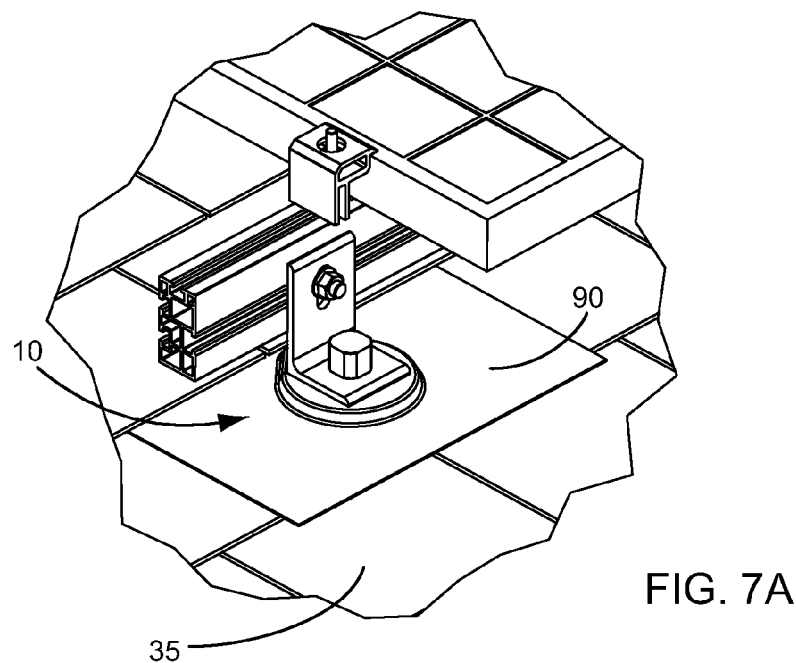
FIG. 7A is an enlarged perspective view of the invention, taken generally about line 7A-7A of FIG. 7.
Figure 9:
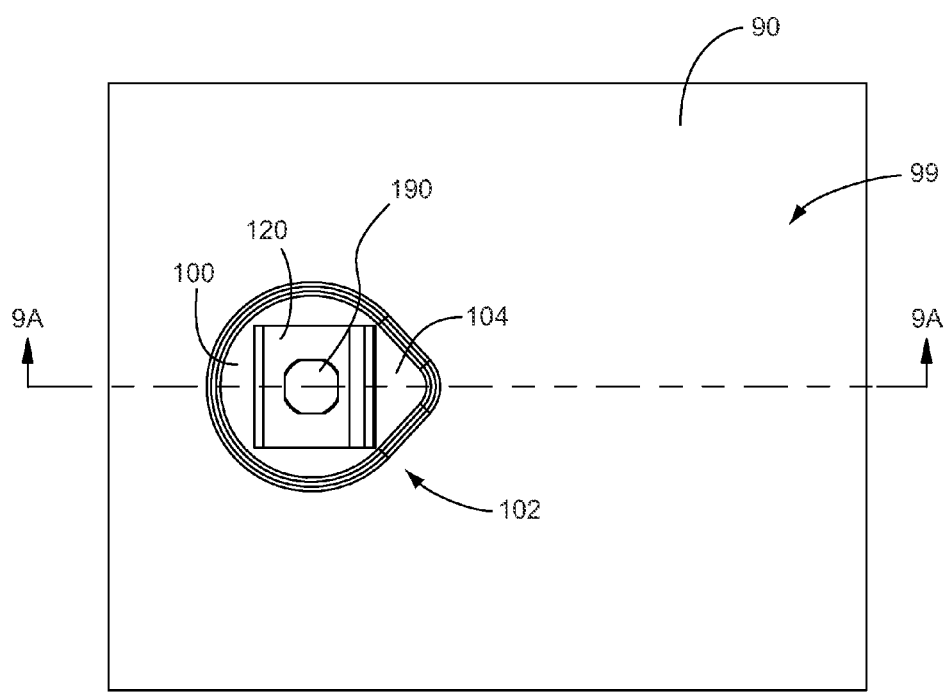
FIG. 9 is a top plan view of the second embodiment of the invention.
Figure 9A:
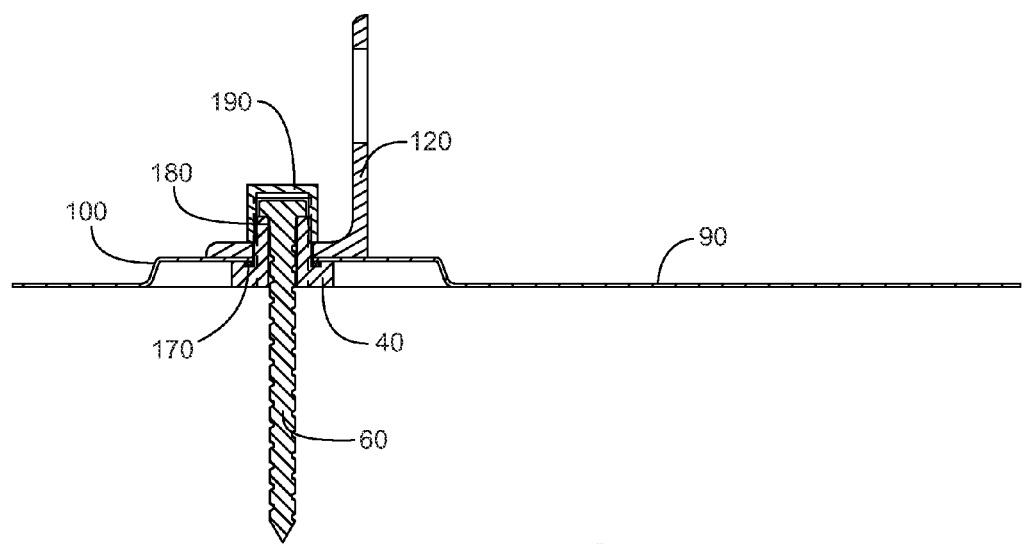
FIG. 9A is a cross-sectional view of the second embodiment of the invention, taken generally along lines 9A-9A of FIG. 9.
Figure 11:
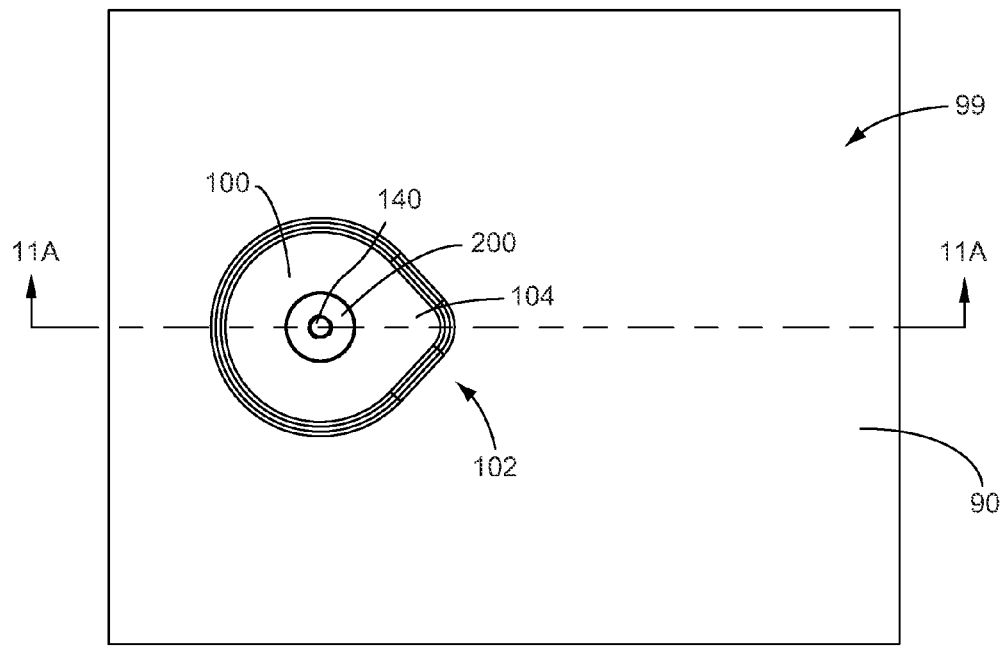
FIG. 11 is a top plan view of the third embodiment of the invention.
Figure 11A:
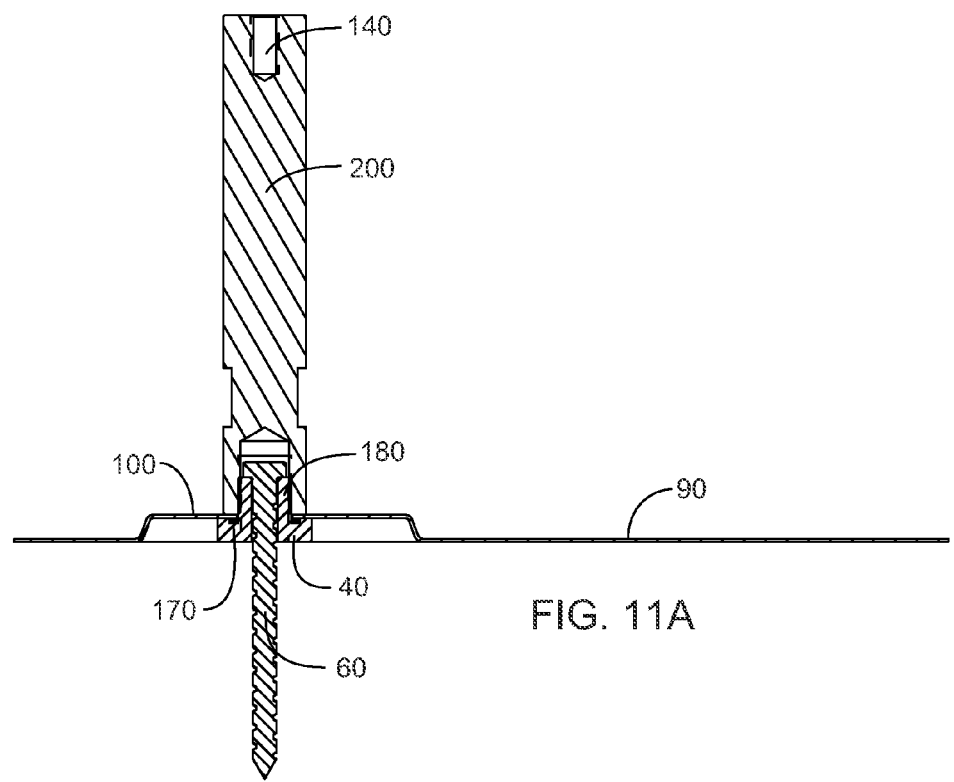
FIG. 11A is a cross-sectional view of the third embodiment of the invention, taken generally along lines 11A-11A of FIG. 11.
Figure 12A:
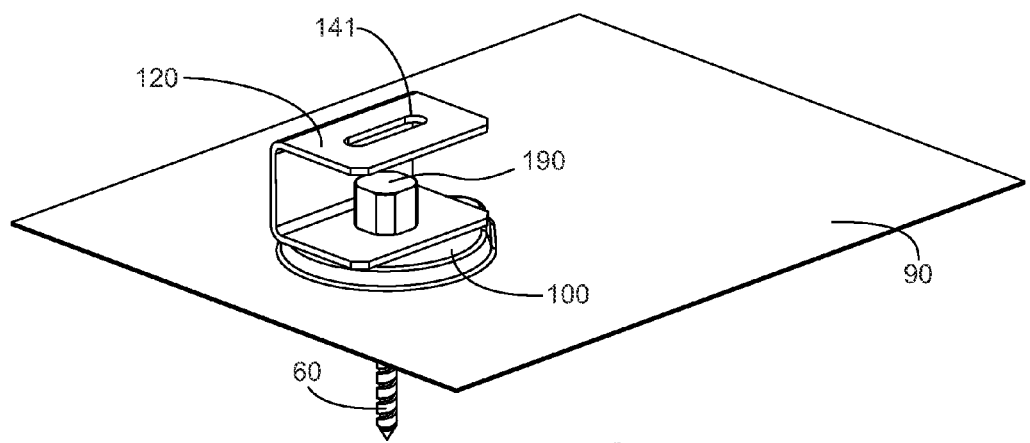
FIG. 12A is a perspective view of an alternate mounting bracket secured with a threaded cap.
Figure 12B:
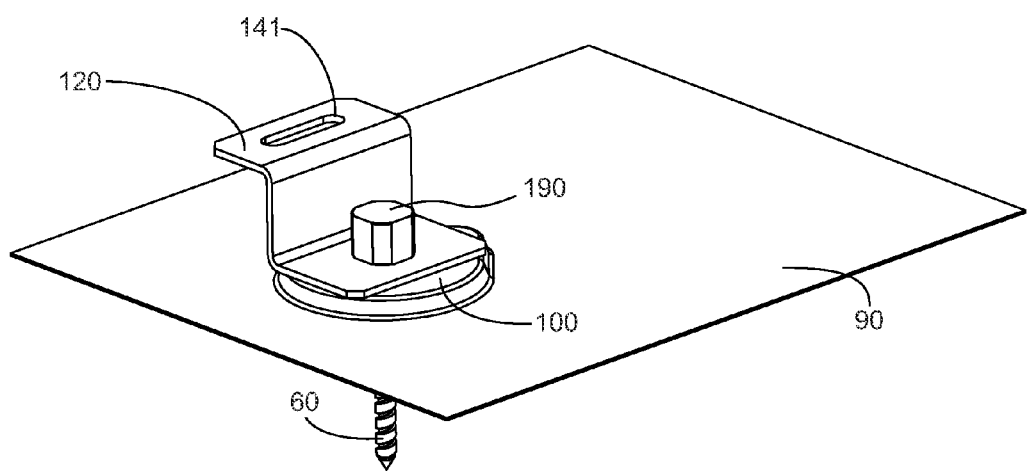
FIG. 12B is a perspective view of an alternate mounting bracket secured with a threaded cap.
Figure 12C:
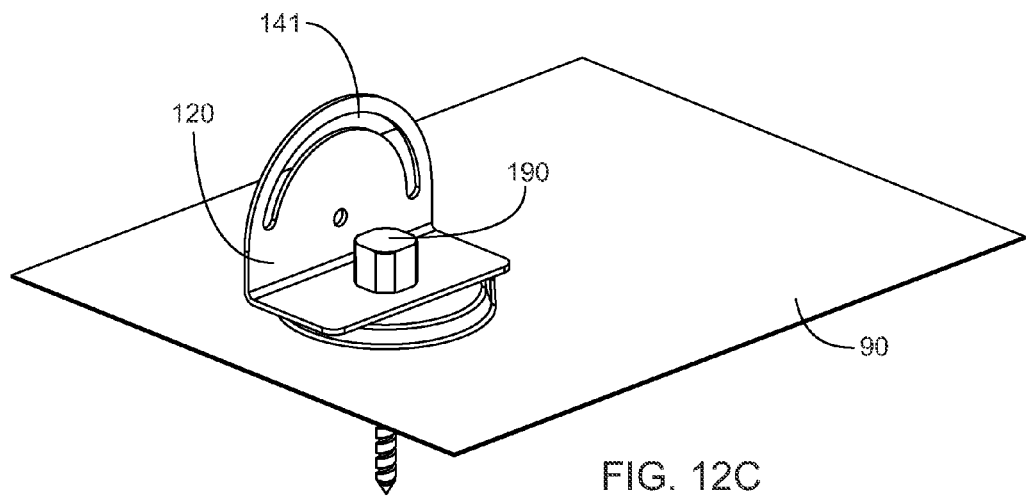
FIG. 12C is a perspective view of an alternate mounting bracket secured with a threaded cap.
Figure 12D:
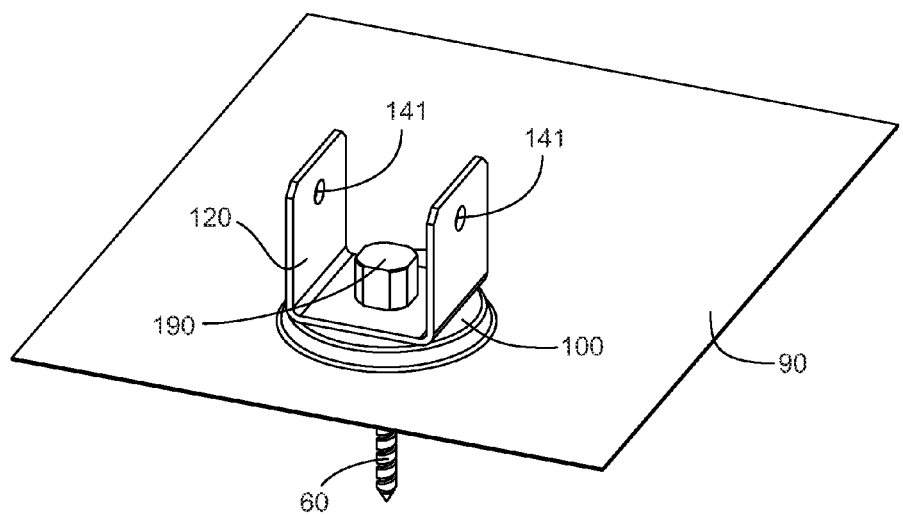
FIG. 12D is a perspective view of an alternate mounting bracket secured with a threaded cap.

In FIGS. 5 and 6, a flashing plate 90 has a lower surface 92, an upper surface 98, and a peripheral edge 95. A base plate recess 100 is formed in the lower surface 92 thereof and adapted to receive the base plate 40 therein such that the lower surface 42 of the base plate 40 may be substantially coplanar with the lower surface 92 of the flashing plate 90, as illustrated in FIG. 6. In a preferred embodiment in FIGS. 1-6, a portion 104 of the base plate recess 100 is tapered at an upper edge 102 thereof, thereby avoiding flat areas that would collect liquid and debris on the roof 30 and facilitating the passage of liquid and debris around the system 10. The base plate recess 100 includes one corresponding aperture 110 therethrough for each bracket projection 44 of the upper surface 48 of the base plate 40, illustrated in FIG. 3. The flashing plate 90 is preferably formed from a water-impervious metal sheet material. However, the flashing plate 90 may also be formed from a weather-impervious plastic material.

In FIGS. 3-6, a mounting bracket 120 has at least one aperture 130 therein and is adapted for receiving one of the bracket projections 44 therethrough for securing the mounting bracket 120 to the at least one bracket projection 44 of the upper surface 48 of the base plate 40, through the corresponding aperture 110 in the flashing plate 90.

The mounting bracket 120 further includes attachment means 140, such as an attachment aperture 141 or the like (FIGS. 3-6) adapted to be fixed with the equipment 20. Additional embodiment of mounting brackets 120 and attachment apertures 141 are illustrated In FIGS. 12A, 12B, 12C, and 12D. Additional attachment means 140 may also be, for example, a mechanical clamp (not shown), a clip (not shown), a hook (not shown), or other mechanical means for attaching the mounting bracket 120 to the equipment 20, as is or becomes known in the art. The mounting bracket 120 may be made from a rigid metal or plastic material, strong enough to withstand outdoor conditions including high winds, rain, snow, and prolonged exposure to sunlight.

In one embodiment, the base plate recess 100 is non-centered on the flashing plate 90 such that a flat portion 99 of the flashing plate 90 is adapted to fit substantially between two adjacent shingles 35, as illustrated in FIGS. 1-6. In another embodiment, the flat portion 99 of the flashing plate 90 is adapted to fit between two shingles 35 and at least partially under a third shingle 35 (FIGS. 1-2 and 7-7A).

In a preferred embodiment, the system 10 includes an elastomeric ring 170 (FIG. 3) placed on each bracket projection 44 between each mechanical machine fastener 80 and the base plate 40 for inhibiting liquid from flowing through the mounting bracket 120.

Figure 13A:
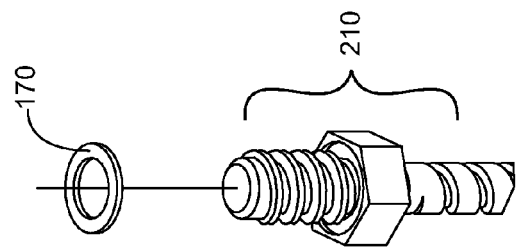
FIG. 13A is a perspective view of the fourth embodiment of the invention.
Figure 13:
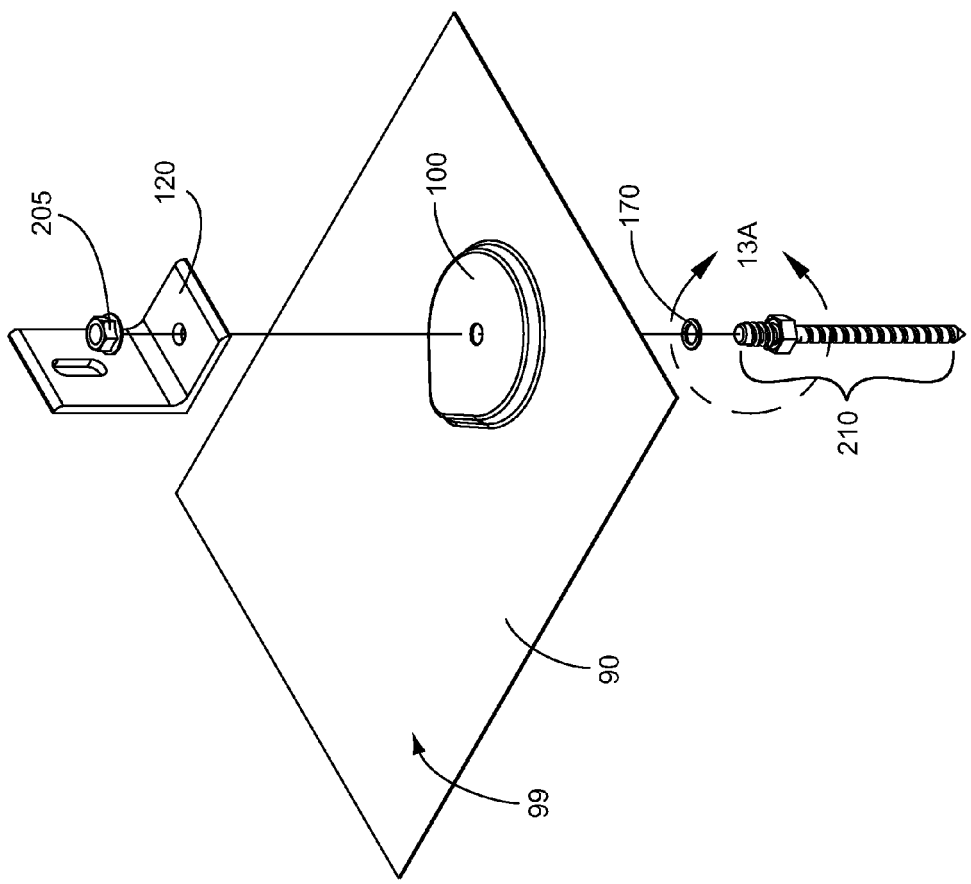
FIG. 13 is an exploded perspective view of a fourth embodiment of the invention.
Figure 14:
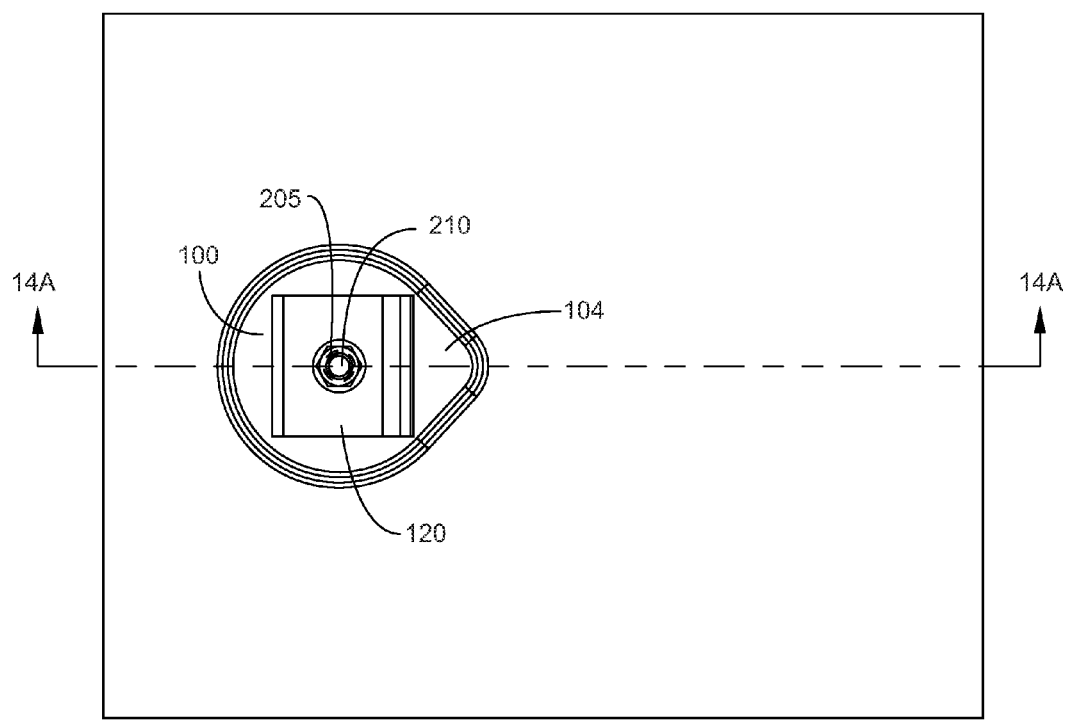
FIG. 14 is a top plan view of the fourth embodiment of the invention.
Figure 14A:
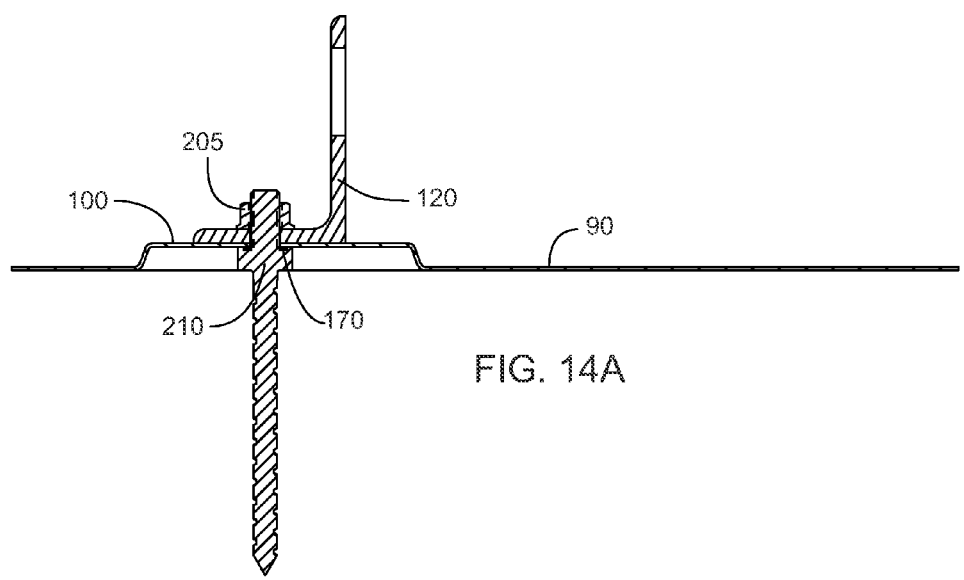
FIG. 14A is a cross-sectional view of the fourth embodiment of the invention, taken generally along lines 14A-14A of FIG. 14.

The following embodiments provide additional advantages and benefits of using fewer parts by integrating structures thereby reducing the costs and steps of installation. In one embodiment, illustrated in FIGS. 7, 7A, 8, 8A, 9 and 9A, the at least one mounting aperture 50 and the at least one bracket projection 44 are combined into at least one hollow projection 180 whereby the mechanical wood fastener 60 passes through the at least one hollow projection 180. In one embodiment, the at least one hollow projection 180 is threaded on an outside surface 182 (FIG. 8) thereof. In another embodiment, the mechanical machine fastener 80 is a threaded cap 190 (FIG. 8). In another alternate embodiment, illustrated in FIGS. 10, 10A, 11, and 11A, the threaded cap 190 and the mounting bracket 120 are combined into an integral mounting cap 200. In one more embodiment, illustrated in FIGS. 13, 13A, 14, and 14A, the base plate 40 and the mechanical wood fastener 60 are combined into an integral base fastener 210. In the embodiment illustrated in FIGS. 13 and 14A, a threaded nut 205 is used as the mechanical machine fastener 80 to secure the mounting bracket 120 to the integral base fastener 210.

While a particular form of the invention has been illustrated and described, it will be apparent that various modifications can be made without departing from the spirit and scope of the invention. For example, other mechanical machine fasteners 80 may include caps or elastic rings that snap onto the at least one bracket projection 44 to secure the mounting bracket 120. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for mounting equipment to a roof having shingles,
the system comprising:
a base plate including a lower surface, an upper surface, and at least one hollow bracket projection projecting upwardly from the upper surface thereof and adapted to receive and pass through at least a portion of a mechanical wood fastener for securing the base plate to the roof, the bracket projection including a threaded outside surface adapted for securing with a mechanical machine fastener;
a flashing plate including a lower surface, and a base plate recess formed in the lower surface of the flashing plate and adapted to receive the base plate therein such that the lower surface of the base plate may be substantially coplanar with the lower surface of the flashing plate, the base plate recess including a corresponding aperture therethrough for the bracket projection; and
a mounting bracket including an aperture therein adapted for receiving the bracket projection therethrough for securing the mounting bracket to the bracket projection through the corresponding aperture in the flashing plate, the mounting bracket
further including attachment means for the equipment.

2. The system of claim 1 wherein the base plate recess is non-centered on the flashing plate such that a flat portion of the flashing plate is adapted to fit substantially between two adjacent shingles.

3. The system of claim 2 wherein the flat portion of the flashing plate is adapted to fit between two shingles and at least partially under a third shingle.

4. The system of claim 1 further including an elastomeric ring placed on each bracket projection between each mechanical machine fastener and the base plate for inhibiting liquid from flowing through the mounting bracket.

5. The system of claim 1 wherein the attachment means for the equipment is an attachment aperture.

6. The system of claim 1 wherein the mechanical machine fastener is a threaded cap.

7. The system of claim 6 wherein the threaded cap and the mounting bracket are combined into an integral mounting cap.

8. The system of claim 1 wherein a portion of the base plate recess is tapered at an upper edge thereof.

* * * * *